(12) United States Patent
Saito

(10) Patent No.: US 7,508,596 B2
(45) Date of Patent: Mar. 24, 2009

(54) OBJECTIVE LENS, OPTICAL PICKUP DEVICE, AND OPTICAL DISC APPARATUS

(75) Inventor: Masahiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/862,611

(22) Filed: Sep. 27, 2007

(65) Prior Publication Data

US 2008/0080066 A1    Apr. 3, 2008

(30) Foreign Application Priority Data

Sep. 28, 2006    (JP)    ............................. 2006-265824

(51) Int. Cl.
*G02B 3/02* (2006.01)
*G02B 13/18* (2006.01)
*G11B 7/00* (2006.01)

(52) U.S. Cl. ................ 359/719; 369/44.13; 369/112.23

(58) Field of Classification Search ................. 359/718, 359/719; 369/44.13, 112.23
See application file for complete search history.

(56) References Cited

U.S. PATENT DOCUMENTS 6,744,568 B2    6/2004    Kitamura et al.

2002/0135891 A1*    9/2002    Kimura et al. .............. 359/795
2006/0198254 A1*    9/2006    Hirai et al. ................ 369/44.13

FOREIGN PATENT DOCUMENTS

JP    2002-303787    10/2002

* cited by examiner

*Primary Examiner*—Scott J Sugarman
(74) *Attorney, Agent, or Firm*—Oblon, Spivak, McClelland, Maier & Neustadt, P.C.

(57) ABSTRACT

An objective lens is included in an optical pickup device that records and/or reproduces an information signal onto and/or from an optical recording medium. The objective lens has a numerical aperture of 0.82 or higher, has first and second surfaces that are both aspherical, and focuses a light beam onto the optical recording medium. The first and second surfaces have surface-to-surface eccentricity therebetween that causes an aberration, the aberration being correctable by tilting an optical axis of the objective lens relative to a central axis of the light beam incident on the objective lens. The aberration caused by the surface-to-surface eccentricity includes a third-order coma aberration. When the optical axis is tilted relative to the central axis of the incident light beam so that the third-order coma aberration becomes substantially 0 mλ rms, each of astigmatism, spherical aberration, and high-order coma aberration becomes 20 mλ rms or less.

5 Claims, 8 Drawing Sheets

OBJECTIVE LENS, OPTICAL PICKUP DEVICE, AND OPTICAL DISC APPARATUS

CROSS REFERENCES TO RELATED APPLICATIONS

The present invention contains subject matter related to Japanese Patent Application JP 2006-265824 filed in the Japanese Patent Office on Sep. 28, 2006, the entire contents of which are incorporated herein by reference.

BACKGROUND OF THE INVENTION

1. Field of the Invention

The present invention relates to objective lenses used in optical pickup devices that record information onto and/or reproduce information from optical recording media, such as optical discs, and also relates to optical pickup devices and optical disc apparatuses.

2. Description of the Related Art

In related art, examples of recording media used for information signals are optical discs, such as compact discs (CD) using light beams having a wavelength of about 785 nm and digital versatile discs (DVD) using light beams having a wavelength of about 660 nm, and optical discs that allow for high-density recording by recording signals thereon or reproducing signals therefrom with light beams having a wavelength of about 405 nm using blue-violet semiconductor lasers. Such optical discs that allow for high-density recording will be referred to as high-density-recording optical discs hereinafter. In order to record information signals onto these types of optical discs or reproduce information signals recorded on the optical discs, optical pickup devices are used.

Generally, a single objective lens used in an optical pickup device is preferably designed such that a spherical aberration on an optical path and a paraxial coma aberration are suppressed and a coma aberration occurring due to eccentricity between a first surface and a second surface of the lens is also suppressed. In optical systems with high numerical aperture and short wavelengths that have been developed with the increase in density in optical discs, the occurrences of spherical aberration on the optical path and paraxial coma aberration are minimized in view of design. Moreover, the eccentricity is minimized by strictly maintaining the fabrication precision and adjustment precision during the fabrication process so that a coma aberration occurring due to eccentricity can be suppressed.

SUMMARY OF THE INVENTION

However, in an optical system of an optical pickup device used for a high-density-recording optical disc, in which the numerical aperture is 0.82 or higher and the usable wavelength is as short as about 400 nm, the incidence angle of a light ray incident on a lens surface and the emission angle of a light ray exiting the lens are high. This reduces the flexibility in design of the lens-surface shape for focusing the light rays. Therefore, if the occurrences of spherical aberration on the optical axis and paraxial coma aberration are suppressed on the basis of optical design, the tolerance for the surface-to-surface eccentricity becomes significantly low. In other words, it is preferred that the degree of surface-to-surface eccentricity between the first surface and the second surface be reduced with extremely high precision. This leads to a lower yield rate for objective lenses used in optical pickup devices and makes cost reduction difficult to achieve.

Japanese Unexamined Patent Application Publication No. 2002-303787 discloses an example of such an objective lens and an optical pickup device.

It is desirable to provide an objective lens, an optical pickup device, and an optical disc apparatus, in which the tolerance for surface-to-surface eccentricity in the objective lens is expanded, the yield rate is improved, and the aberration is sufficiently reduced.

According to an embodiment of the present invention, there is provided an objective lens included in an optical pickup device that records an information signal onto and/or reproduces an information signal from an optical recording medium. The objective lens has a numerical aperture of 0.82 or higher and has a first surface and a second surface that are both aspherical. The objective lens focuses a light beam onto the optical recording medium. The first surface and the second surface have surface-to-surface eccentricity therebetween that causes an aberration, the aberration being correctable by tilting an optical axis of the objective lens relative to a central axis of the light beam incident on the objective lens. The aberration caused by the surface-to-surface eccentricity includes a third-order coma aberration. When the optical axis is tilted relative to the central axis of the incident light beam so that the third-order coma aberration becomes substantially 0 m$\lambda$ rms, each of astigmatism, spherical aberration, and high-order coma aberration becomes 20 m$\lambda$ rms or less.

According to another embodiment of the present invention, there is provided an optical pickup device that records an information signal onto and/or reproduces an information signal from an optical recording medium. The optical pickup device includes an objective lens that has a numerical aperture of 0.82 or higher and has a first surface and a second surface that are both aspherical. The objective lens focuses a light beam onto the optical recording medium. The objective lens has surface-to-surface eccentricity between a first surface and a second surface thereof, the surface-to-surface eccentricity causing an aberration that is correctable by tilting an optical axis of the objective lens relative to a central axis of the light beam incident on the objective lens. The aberration caused by the surface-to-surface eccentricity includes a third-order coma aberration. When the optical axis is tilted relative to the central axis of the incident light beam so that the third-order coma aberration becomes substantially 0 m$\lambda$ rms, each of astigmatism, spherical aberration, and high-order coma aberration becomes 20 m$\lambda$ rms or less.

According to another embodiment of the present invention, there is provided an optical disc apparatus that includes an optical pickup device that records an information signal onto and/or reproduces an information signal from an optical recording medium. This optical pickup device is defined by that described above.

In the objective lens according to the embodiment of the present invention, a third-order coma aberration occurring due to surface-to-surface eccentricity is corrected by tilting the optical axis of the objective lens relative to the central axis of incident light, and the aberration components including astigmatism, spherical aberration, and high-order coma aberration are controlled. Consequently, when this objective lens is used in an optical pickup device or an optical disc apparatus, the tolerance for surface-to-surface eccentricity in the objective lens can be expanded while favorable recording/reproducing characteristics are maintained. Accordingly, this contributes to a higher yield rate and lower cost.

In the optical pickup device and the optical disc apparatus according to the embodiments of the present invention, a third-order coma aberration occurring due to surface-to-surface eccentricity in the objective lens is corrected by tilting the optical axis of the objective lens relative to the central axis of incident light, and the aberration components including astigmatism, spherical aberration, and high-order coma aberration are controlled. Consequently, while favorable recording/reproducing characteristics are maintained, the tolerance for surface-to-surface eccentricity in the objective lens can be expanded. Accordingly, this contributes to a higher yield rate and lower cost.

DESCRIPTION OF THE PREFERRED EMBODIMENTS

An optical pickup device 1 and an optical disc apparatus equipped with the optical pickup device 1 according to embodiments of the present invention will now be described with reference to the drawings.

The optical pickup device 1 according to an embodiment of the present invention records and reproduces information onto and from an optical disc 8, and constitutes an optical disc apparatus together with, for example, a spindle motor serving as a driver for rotating the optical disc 8 and a feed motor that moves the optical pickup device 1 in the radial direction of the optical disc 8. The optical pickup device 1 records and reproduces information onto and from the optical disc 8 rotated by the spindle motor.

Here, the optical disc 8 used is, for example, a high-density-recording optical disc on which information can be recorded at high density using a blue-violet semiconductor laser having an emission wavelength of about 405 nm. Alternatively, the embodiments of the present invention are also applicable to optical pickup devices that record information on and/or reproduce information from optically recordable and/or reproducible recording media other than the aforementioned optical disc, to optical disc apparatuses equipped with such optical pickup devices, and to objective lenses included in such optical pickup devices.

Figure 1:
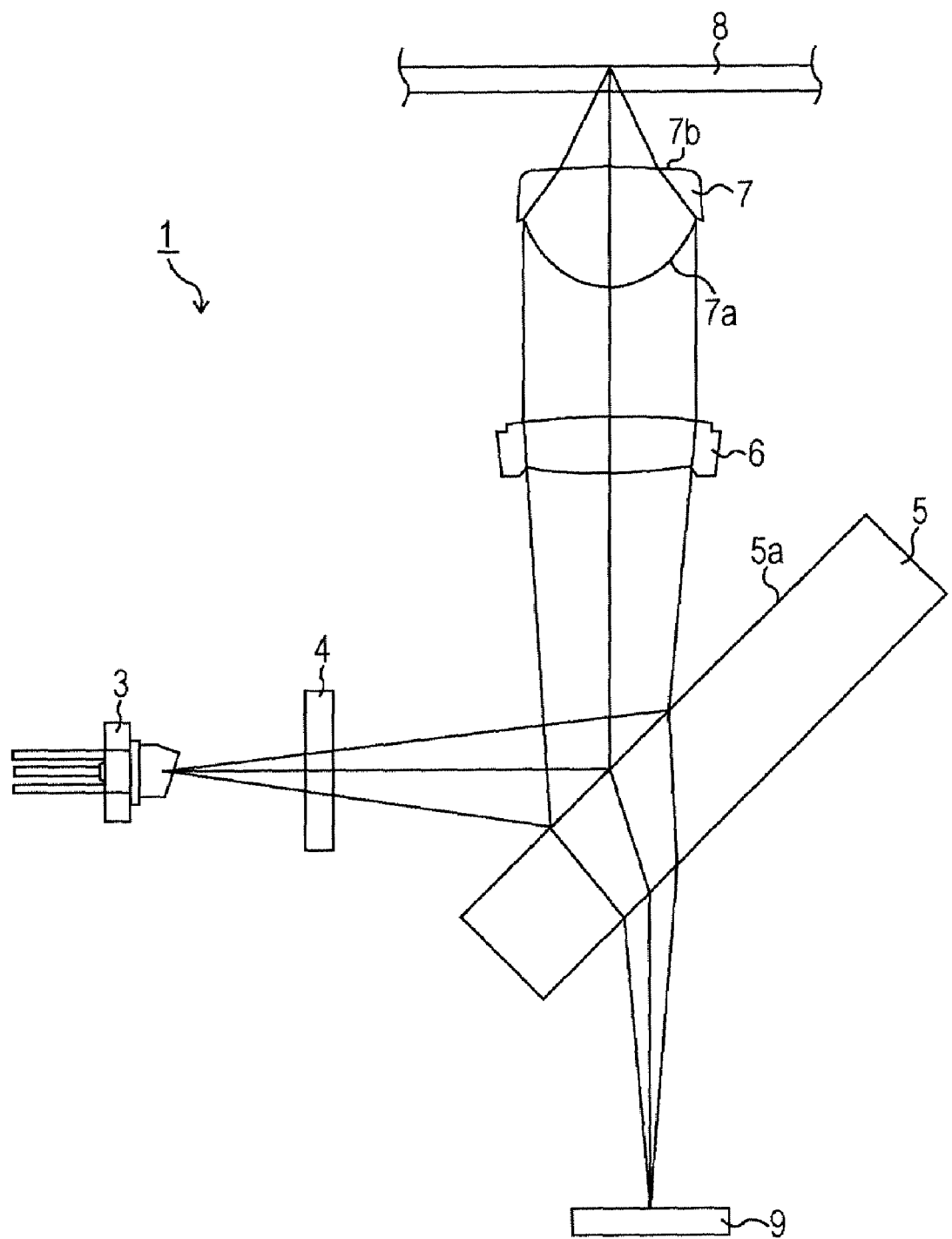
FIG. 1 is a ray diagram showing an optical system of an optical pickup device according to an embodiment of the present invention.

Referring to FIG. 1, the optical pickup device 1 according to the embodiment of the present invention includes a light source 3 that emits a light beam having a wavelength of about 405 nm, a diffractive optical element 4 that splits the light beam emitted from the light source 3 into three beams, a beam splitter 5 that reflects or transmits the light beams split by the diffractive optical element 4 and reflected light from the optical disc 8, a collimator lens 6, an objective lens 7 that focuses the light emitted from the light source 3 onto a signal recording face of the optical disc 8, and a light detecting unit 9 that detects the light reflected at and returning from the optical disc 8.

The light source 3 has a light-emitting portion that emits a light beam having a wavelength of about 405 nm. The wavelength of a light beam emitted from the light source 3 is not limited to that written above. The diffractive optical element 4 is provided between the light source 3 and the beam splitter 5 and has a diffractive portion that splits the light beam emitted from the light source 3 into three beams.

The beam splitter 5 is disposed on an optical path between the diffractive optical element 4 and the collimator lens 6 and has a half-mirror face 5a at a side proximate to the light source 3. The half-mirror face 5a of the beam splitter 5 reflects the three split light beams emitted from the diffractive optical element 4 towards the optical disc 8. Moreover, the beam splitter 5 transmits the light beam reflected at and returning from the optical disc 8 so that the returning light beam is emitted towards the light detecting unit 9. In other words, the beam splitter 5 is an optical element at which the optical path of the returning light beam diverges from the outgoing optical path.

The collimator lens 6 is disposed between the beam splitter 5 and the objective lens 7 and collimates the light beams reflected by the beam splitter 5.

The objective lens 7 focuses the light beams substantially collimated by the collimator lens 6 onto the signal recording face of the optical disc 8. The incidence side of the objective lens 7 is provided with an aperture stop (not shown). This aperture stop limits the numerical aperture of the light beams incident on the objective lens 7 to a desired numerical aperture value.

The objective lens 7 is a single objective lens with a numerical aperture (NA) of 0.82 or higher, and is aspherical at its opposite surfaces, namely, a first surface 7a on its incidence side and a second surface 7b on its emission side. The objective lens 7 is provided with a tilting mechanism (not shown) serving as a tilting unit for tilting the optical axis of the objective lens 7 to compensate for aberrations. The direction in which the objective lens 7 is to be tilted by the tilting unit may be a so-called radial tilting direction in which the objective lens 7 is tilted about the tangential direction as the axis, or may be a so-called tangential tilting direction in which the objective lens 7 is tilted about the tracking direction as the axis.

When there is eccentricity between the first surface 7a and the second surface 7b with respect to proper design values due to fabrication error, the tilting unit tilts the optical axis of the objective lens 7 so as to compensate for an aberration, such as a third-order coma aberration, caused by such surface-to-surface eccentricity. Here, the term "surface-to-surface eccentricity" refers to a state where the center of the first surface 7a on a plane orthogonal to the optical axis and the center of the second surface 7b on a plane orthogonal to the optical axis are misaligned with each other in a direction perpendicular to the optical axis. The amount of misalignment corresponds to an amount of eccentricity. Furthermore, the term "optical axis of the objective lens 7" refers to a central axis of the objective lens 7 extending in the optical-axis direction. To tilt the optical axis of the objective lens 7 means to tilt the optical axis of the objective lens 7 relative to the central axis of an incoming light beam (which is also called "incident light"). A tilt angle by which the optical axis of the objective lens 7 is to be tilted to adjust a third-order aberration caused by surface-to-surface eccentricity to substantially 0 m$\lambda$ rms is 0.5° (degrees) or lower. This angle is determined on the basis of the lens diameter and the working distance of the objective lens 7. Specifically, with a high numerical aperture (0.82 or higher) and a short wavelength (about 405 nm), if the tilt angle is 0.5 or higher, the objective lens 7 could possibly hit against the optical disc 8.

In other words, the objective lens 7 is given a shape such that the optical axis of the objective lens 7 is tiltable by 0.5° or lower for adjusting a third-order aberration caused by eccentricity to substantially 0 m$\lambda$ rms.

Furthermore, the objective lens 7 is shaped such that, when the optical axis of the objective lens 7 is tilted by a predetermined tilt angle to adjust a third-order coma aberration to substantially 0 m$\lambda$ rms, an aspherical aberration, a spherical aberration, and a high-order coma aberration are 20 m$\lambda$ rms or less. Here, a third-order coma aberration is a third-order coma aberration component when an aberration function is expressed in a Zernike polynomial. A high-order coma aberration is the square root of the sum of squares of a fifth-order coma aberration, a seventh-order coma aberration, and a ninth-order coma aberration.

Specifically, for example, the aspherical shape of the objective lens 7 can be adjusted to control third-order off-axis coma aberration characteristics. Thus, when surface-to-surface eccentricity occurs between the first surface 7a and the second surface 7b of the objective lens 7, the optical axis of the objective lens 7 may be tilted so as to adjust a third-order coma aberration to substantially 0 m$\lambda$ rms. In this case, each of third-order astigmatism, a third-order spherical aberration, and a high-order coma aberration is reduced to 20 m$\lambda$ rms or less.

For example, in a state where the aspherical shape of the objective lens 7 is adjusted and the optical axis of the objective lens 7 is aligned with a direction perpendicular to the signal recording face of the optical disc 8, the magnitude of a third-order coma aberration occurring upon incidence of light having a central axis that is tilted at 1° with respect to the optical axis of the objective lens 7 becomes 30 m$\lambda$ rms or more, whereby the aberrations can be controlled to the abovementioned amounts. Furthermore, in a state where the optical axis of the objective lens 7 is aligned with the direction perpendicular to the signal recording face of the optical disc 8, the magnitude of a high-order coma aberration excluding a third-order coma aberration occurring upon incidence of light having a central axis tilted at 1° with respect to the optical axis of the objective lens 7 can be reduced to 20 m$\lambda$ rms or less, whereby the aberrations can be controlled to the abovementioned amounts. In addition, by limiting a coma aberration occurring due to surface-to-surface eccentricity in the objective lens 7 substantially and exclusively to a third-order coma aberration, the aberrations can be controlled to the abovementioned amounts. Accordingly, a paraxial third-order coma aberration that is generally reduced as much as possible in view of design is intentionally controlled to a value that is about 30 m$\lambda$ rms or more, and the magnitude of a high-order coma aberration in that case is controlled to a value that is 20 m$\lambda$ rms or less. Thus, even when surface-to-surface eccentricity occurs in the objective lens 7 due to, for example, fabrication error, such as a surface-to-surface eccentricity of about 2 $\mu$m, the optical axis of the objective lens 7 can be tilted so as to adjust a third-order coma aberration to substantially 0 m$\lambda$ rms, and to thus reduce each of third-order astigmatism, a third-order spherical aberration, and a high-order coma aberration to 20 m$\lambda$ rms or less.

Specifically, the objective lens 7 is formed such that, in a state where the objective lens 7 does not have surface-to-surface eccentricity under the design conditions and the optical axis of the objective lens 7 is aligned with the direction perpendicular to the signal recording face of the optical disc 8 under the design conditions, the magnitude of a third-order coma aberration occurring upon incidence of light having a central axis that is tilted at 1° with respect to the optical axis of the objective lens 7 is 30 m$\lambda$ rms or more, and the magnitude of a high-order coma aberration is 20 m$\lambda$ rms or less. Consequently, even when such surface-to-surface eccentricity occurs, the objective lens 7 can be tilted to adjust the third-order coma aberration to substantially 0 m$\lambda$ rms, and to thus reduce each aberration component.

Accordingly, the objective lens 7 is designed by adjusting an off-axis third-order coma aberration, and a third-order coma aberration occurring due to surface-to-surface eccentricity is corrected by tilting the optical axis of the objective lens 7. In this case, the aberration components including third-order astigmatism, a third-order spherical aberration, and a high-order coma aberration are controlled so that favorable recording/reproducing characteristics are maintained. At the same time, the tolerance for surface-to-surface eccentricity in the objective lens 7 can be expanded, thereby achieving a higher yield rate and cost reduction.

Although the tilt angle of the objective lens 7 is desirably set while confirming the entire wavefront aberration constituted by a coma aberration, astigmatism, and spherical aberration, the objective lens 7 is generally tilted so that a third-order coma aberration, which is readily graspable and adjustable in the form of a spot or the like, becomes substantially 0 m$\lambda$ rms. In first to sixth embodiments to be described below, the entire wavefront aberration can be reduced at a tilt angle at which a third-order coma aberration becomes substantially 0 m$\lambda$ rms.

In the above description, the aberration components including third-order astigmatism, a third-order spherical aberration, and a high-order coma aberration are controlled when the optical axis of the objective lens 7 is tilted to adjust a third-order coma aberration occurring due to surface-to-surface eccentricity to substantially 0 m$\lambda$ rms. Alternatively, aberration components including astigmatism with high-order astigmatism added to third-order astigmatism, a spherical aberration with a high-order spherical aberration added to a third-order spherical aberration, and a high-order coma aberration like that mentioned above may be controlled. Here, the reason the aberration components including third-order astigmatism, a third-order spherical aberration, and a high-order coma aberration are controlled is that high-order astigmatism and high-order spherical aberration in this case are small enough that they are substantially negligible.

The light detecting unit 9 has a photodetector for receiving the light beam reflected at the signal recording face of the optical disc 8, and detects various signals such as information signals, tracking error signals, and focus error signals.

Based on a focus servo signal and a tracking servo signal generated in accordance with returning light detected by the light detecting unit 9, the optical pickup device 1 having the above-described configuration drives the objective lens 7 to perform focus servo and tracking servo operations. When the objective lens 7 is driven, the objective lens 7 is shifted to a focus position with respect to the signal recording face of the optical disc 8 so that a light beam can be focused on the recording face of the optical disc 8. Thus, information is recorded on or reproduced from the optical disc 8.

The optical pickup device 1 and the optical disc apparatus according to the embodiments of the present invention are equipped with the above-described objective lens 7 so that even when the objective lens 7 has a surface-to-surface eccentricity of about 2.0 μm, a third-order coma aberration can be adjusted to substantially 0 mλ rms by tilting the optical axis of the objective lens 7. Because the astigmatism, spherical aberration, and high-order coma aberration can all be reduced to 20 mλ rms or less, the entire aberration can be reduced to an extent that favorable recording/reproducing characteristics can be maintained. In other words, the tolerance for surface-to-surface eccentricity can be expanded, thereby achieving a higher yield rate and cost reduction.

The optical pickup device 1 and the optical disc apparatus according to the embodiments of the present invention are advantageous especially in a case where an objective lens having a high numerical aperture of 0.82 or higher and intended for a short wavelength of about 405 nm is used. As mentioned above, by controlling the aberration components when there is off-axis aberration or surface-to-surface eccentricity in the objective lens, the tolerance for surface-to-surface eccentricity in the objective lens can be expanded. Accordingly, the optical pickup device 1 and the optical disc apparatus have greater tolerance for surface-to-surface eccentricity, thereby achieving a higher yield rate and cost reduction for lens fabrication.

First to sixth embodiments of the objective lens 7 included in the optical pickup device 1 will be described below with specific numerical values. Before proceeding to the description of the first to sixth embodiments, a comparative example to be compared with these embodiments of the present invention will be described first.

In the comparative example and the first to sixth embodiments to be described below, the first surface 7a of the objective lens 7 is a surface proximate to the light source 3, whereas the second surface 7b is a surface proximate to the optical disc 8. The design wavelength is 405 nm, and the refractive index of the optical disc 8 is 1.617. Reference character "f" indicates the focal length (mm) of the objective lens 7, "R" indicates the radius of curvature (mm) of the objective lens 7, "d" indicates the thickness (mm) of the objective lens 7 at the optical-axis position, "n" indicates the refractive index of the objective lens 7 at the usable wavelength (405 nm), "t" indicates the thickness (μm) of the optical disc 8, "NA" indicates the numerical aperture of the objective lens 7 when a light beam is focused onto the optical disc 8.

The aspherical shapes of the first surface 7a and the second surface 7b of the objective lens 7 are determined from Expression 1 below. In Expression 1, "h" indicates the distance (mm) from the optical axis, "Z(h)" indicates the distance (mm) between a tangential plane and a vertex of a lens surface at a position corresponding to a distance h from the optical axis, "K" indicates a conic constant, and $A_i$ indicates an aspherical constant of an i-th order.

Expression 1

$$Z(h) = \frac{h^2/R}{1+\sqrt{1-(1+K)h^2/R^2}} + \sum_{i=2} A_i h^i \quad (1)$$

COMPARATIVE EXAMPLE

In an objective lens of a comparative example, "f", "n", "d", "t", and "NA" are as follows.
f: 2.2 (mm)
n: 1.602
d: 2.59 (mm)
t: 87.5 (μm)
NA: 0.85

"R", "K", and "$A_i$" indicating the shape of the first surface at the incidence side of the objective lens of the comparative example are as follows.

The Shape of the First Surface
R: 1.507 (mm)
K: −0.639
$A_4$: 7.274×10$^{-3}$
$A_6$: −3.579×10$^{-4}$
$A_8$: 2.390×10$^{-3}$
$A_{10}$: −1.443×10$^{-3}$
$A_{12}$: 2.842×10$^{-4}$
$A_{14}$: 2.394×10$^{-4}$
$A_{16}$: −1.723×10$^{-4}$
$A_{18}$: 4.429×10$^{-5}$
$A_{20}$: −4.273×10$^{-6}$ "R", "K", and "$A_i$" indicating the shape of the second surface at the emission side of the objective lens of the comparative example are as follows.

Figure 2A:
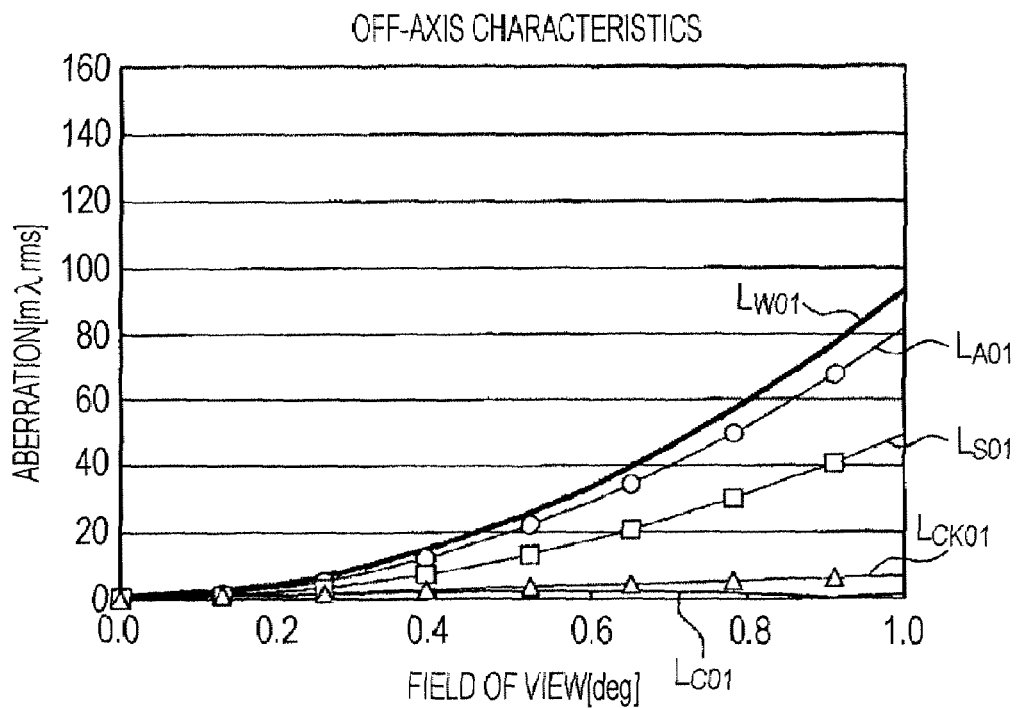
FIGS. 2A and 2B illustrate aberration characteristics of an objective lens of a comparative example provided so as to be compared with an objective lens included in the optical pickup device according to the embodiment of the present invention, FIG. 2A illustrating off-axis characteristics and FIG. 2B illustrating tilt characteristics.
Figure 2B:
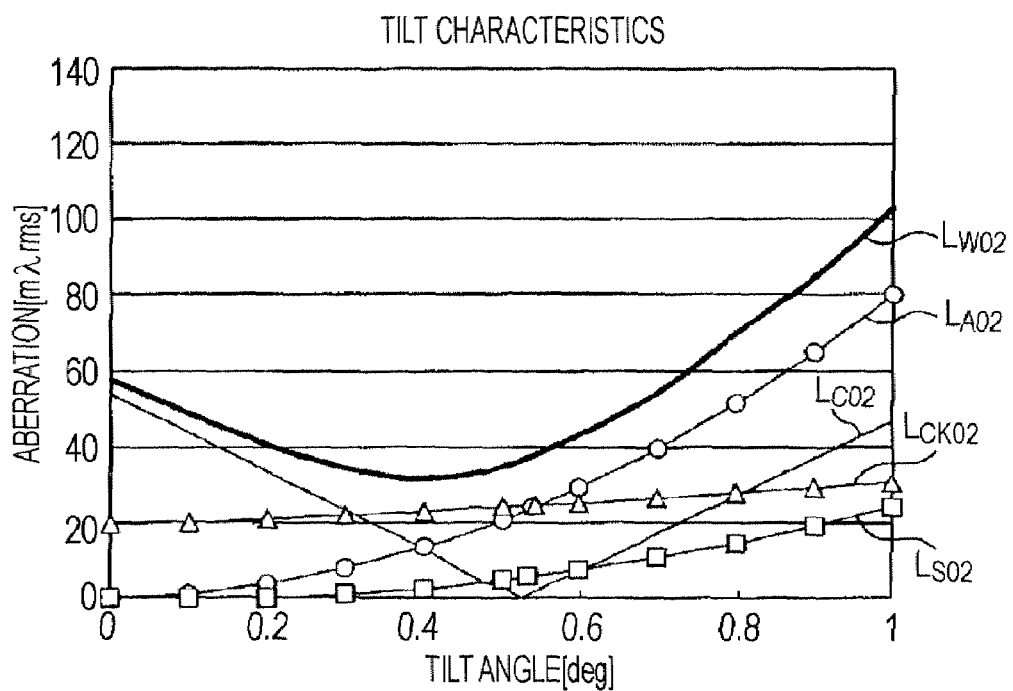

The Shape of the Second Surface
R: −3.881 (mm)
K: −70.802
$A_4$: 9.646×10$^{-2}$
$A_6$: −1.038×10$^{-1}$
$A_8$: 7.586×10$^{-2}$
$A_{10}$: −3.881×10$^{-2}$
$A_{12}$: 1.141×10$^{-2}$
$A_{14}$: −1.430×10$^{-3}$ FIG. 2A shows off-axis characteristics obtained under the above design conditions. FIG. 2B shows tilt characteristics in a case where the first and second surfaces have a surface-to-surface eccentricity of 2 μm under the above conditions.

Specifically, FIG. 2A shows changes in aberration in accordance with changes in field of view under the design conditions. In FIG. 2A, a solid line LC01 indicates changes in third-order coma aberration in accordance with changes in field of view, a solid line LCK01 indicates changes in high-order coma aberration in accordance with changes in field of view, a solid line LA01 indicates changes in third-order astigmatism in accordance with changes in field of view, a solid line LS01 indicates changes in third-order spherical aberration in accordance with changes in field of view, and a solid line LW01 indicates changes in wavefront aberration, which is a total of all the aberrations, in accordance with changes in field of view. Moreover, the abscissa axis indicates a field of view (degree), and the ordinate axis indicates the amount of aberration (mλ rms). In this case, a field of view indicates an angle of a main light ray incident on the objective lens. A third-order coma aberration and a high-order coma aberration corresponding to a field of view x° are a third-order coma aberration and a high-order coma aberration that occur when a light ray having its central axis tilted at x° with respect to the optical axis of the objective lens is incident on the lens in a state where the optical axis of the objective lens is aligned with a direction perpendicular to the signal recording face of the optical disc. In this case, x indicates an arbitrary angle.

FIG. 2B corresponds to a case where the optical axis of the objective lens having a surface-to-surface eccentricity of 2 μm between the first and second surfaces is tilted, and shows changes in aberration in accordance with changes in tilt angle. In FIG. 2B, a solid line LC02 indicates changes in third-order coma aberration in accordance with changes in tilt angle, a solid line LCK02 indicates changes in high-order coma aberration in accordance with changes in tilt angle, a solid line LA02 indicates changes in third-order astigmatism in accordance with changes in tilt angle, a solid line LS02 indicates changes in third-order spherical aberration in accordance with changes in tilt angle, and a solid line LW02 indicates changes in wavefront aberration, which is a total of all the aberrations, in accordance with changes in tilt angle. Moreover, the abscissa axis indicates a tilt angle (degree), and the ordinate axis indicates the amount of aberration (mλ rms).

As shown in FIG. 2A, the off-axis wavefront aberration is held low at 1.2 mλ rms, and the third-order coma aberration and high-order coma aberration at a field of view of 1° are 1.1 mλ rms and 6.9 mλ rms, respectively.

Referring to FIG. 2B, in a case where the first and second surfaces have an eccentricity of 2 μm, when the tilt angle is 0°, the third-order coma aberration is 53.6 mλ rms and the high-order coma aberration is 19.2 mλ rms. In this state, the third-order astigmatism is 0.0 mλ rms, and the third-order spherical aberration is 0.1 mλ rms.

A tilt angle that allows the third-order coma aberration to be 0.0 mλ rms is 0.5°. When the tilt angle is 0.5°, the high-order coma aberration is 24.2 mλ rms, the third-order astigmatism is 20.6 mλ rms, and the third-order spherical aberration is 4.3 mλ rms.

Generally, when a signal on an optical disc is to be read with an objective lens, it is preferable that the third-order coma aberration, the third-order astigmatism, and the high-order coma aberration be 20 mλ rms or less and that the entire wavefront aberration be 40 mλ rms or less.

However, with the design of the comparative example, when the objective lens 7 is tilted by 0.5°, the third-order astigmatism and the high-order coma aberration exceed 20 mλ rms as shown in FIG. 2B. Moreover, where the third-order astigmatism and the high-order coma aberration are 20 mλ rms or less in the comparative example, the third-order coma aberration exceeds 20 mλ rms by a significant amount. In order to keep the third-order coma aberration below 20 mλ rms, the eccentricity between the first and second surfaces are preferably reduced to about 1 μm or less.

Furthermore, the tilt angle for reducing the third-order coma aberration exceeds 0.5°, and it is thus difficult to reduce the tilt angle to 0.5° or lower. In this case, the wavefront aberration is 37.4 mλ rms, which is preferably reduced.

The objective lens according to first to sixth embodiments of the present invention provided for solving the aforementioned problems existing in the objective lens of the comparative example will be described below.

First Embodiment

In the objective lens according to the first embodiment, "f", "n", "d", "t", and "NA" are as follows.
 f: 2.2 (mm)
 n: 1.602
 d: 2.59 (mm)
 t: 87.5 (μm)
 NA: 0.85
"R", "K", and "$A_i$" indicating the shape of the first surface at the incidence side of the objective lens of the first embodiment are as follows.

The Shape of the First Surface
 R: 1.526 (mm)
 K: −0.716
 $A_4$: $1.060 \times 10^{-2}$
 $A_6$: $-1.873 \times 10^{-4}$
 $A_8$: $2.403 \times 10^{-3}$
 $A_{10}$: $-1.457 \times 10^{-3}$
 $A_{12}$: $3.074 \times 10^{-4}$
 $A_{14}$: $2.148 \times 10^{-4}$
 $A_{16}$: $-1.565 \times 10^{-4}$
 $A_{18}$: $3.939 \times 10^{-5}$
 $A_{20}$: $-3.651 \times 10^{-6}$ "R", "K", and "$A_i$" indicating the shape of the second surface at the emission side of the objective lens of the first embodiment are as follows.

Figure 3A:
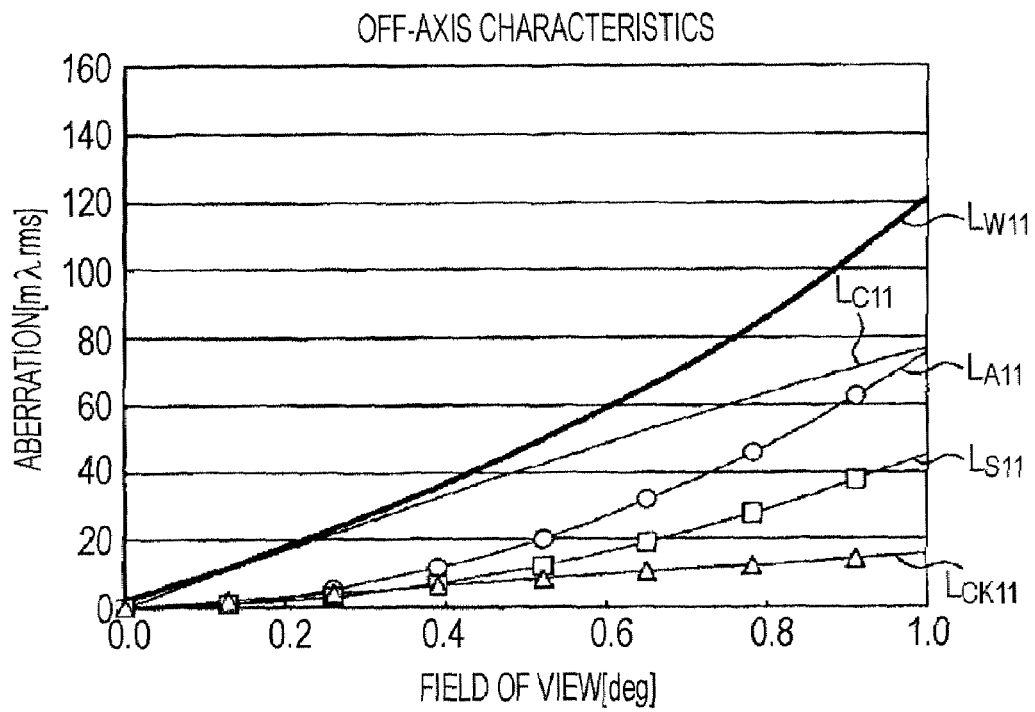
FIGS. 3A and 3B illustrate aberration characteristics of an objective lens according to a first embodiment, FIG. 3A illustrating off-axis characteristics and FIG. 3B illustrating tilt characteristics.
Figure 3B:
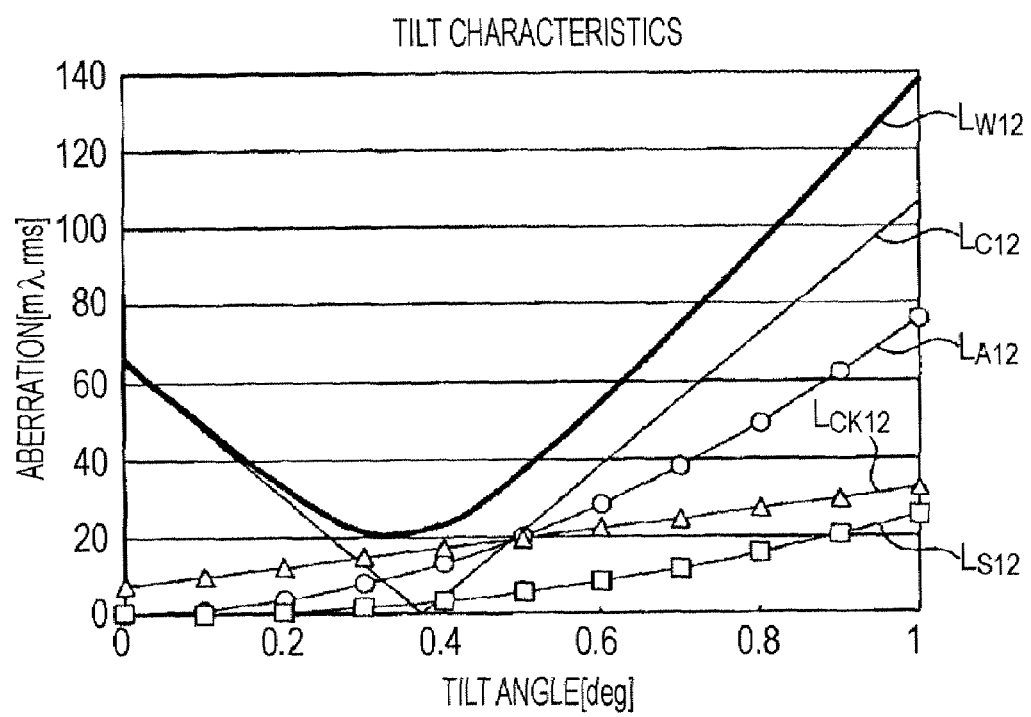

The Shape of the Second Surface
 R: −3.643 (mm)
 K: −91.568
 $A_4$: $7.597 \times 10^{-2}$
 $A_6$: $-8.575 \times 10^{-2}$
 $A_8$: $7.321 \times 10^{-2}$
 $A_{10}$: $-4.202 \times 10^{-2}$
 $A_{12}$: $1.337 \times 10^{-2}$
 $A_{14}$: $-1.711 \times 10^{-3}$
 $A_{16}$: $-2.222 \times 10^{-4}$
 $A_{18}$: $1.462 \times 10^{-4}$
 $A_{20}$: $-2.884 \times 10^{-5}$ FIG. 3A shows off-axis characteristics obtained when a collimated light beam is incident on the objective lens 7 with the above design conditions. FIG. 3B shows tilt characteristics in a case where the first and second surfaces have a surface-to-surface eccentricity of 2 μm under the above conditions.

FIGS. 3A, 4A, 5A, 6A, 7A, and 8A each show changes in aberration in accordance with changes in field of view under the design conditions. In these figures, solid lines LC11, LC21, LC31, LC41, LC51, and LC61 indicate changes in third-order coma aberration in accordance with changes in field of view, solid lines LCK11, LCK21, LCK31, LCK41, LCK51, LCK61 indicate changes in high-order coma aberration in accordance with changes in field of view, solid lines LA11, LA21, LA31, LA41, LA51, and LA61 indicate changes in third-order astigmatism in accordance with changes in field of view, solid lines LS11, LS21, LS31, LS41, LS51, and LS61 indicate changes in third-order spherical aberration in accordance with changes in field of view, and solid lines LW11, LW21, LW31, LW41, LW51, and LW61 indicate changes in wavefront aberration, which is a total of all the aberrations, in accordance with changes in field of view. Moreover, in each figure, the abscissa axis indicates a field of view (degree), and the ordinate axis indicates the amount of aberration (mλ rms). In this case, a field of view indicates an angle of a main light ray incident on the objective lens. A third-order coma aberration and a high-order coma aberration corresponding to a field of view x° are a third-order coma aberration and a high-order coma aberration that occur when a light ray having its central axis tilted at x° with respect to the optical axis of the objective lens is incident on the lens in a state where the optical axis of the objective lens is aligned with a direction perpendicular to the signal recording face of the optical disc. In this case, x indicates an arbitrary angle.

FIGS. 3B, 4B, 5B, 6B, 7B, and 8B each correspond to a case where the optical axis of the objective lens having a surface-to-surface eccentricity of 2 μm between the first surface 7a and the second surface 7b is tilted, and show changes in aberration in accordance with changes in tilt angle. In these figures, solid lines LC12, LC22, LC32, LC42, LC52, and LC62 indicate changes in third-order coma aberration in accordance with changes in tilt angle, solid lines LCK12, LCK22, LCK32, LCK42, LCK52, and LCK62 indicate changes in high-order coma aberration in accordance with changes in tilt angle, solid lines LA12, LA22, LA32, LA42, LA52, and LA62 indicate changes in third-order astigmatism in accordance with changes in tilt angle, solid lines LS12, LS22, LS32, LS42, LS52, and LS62 indicate changes in third-order spherical aberration in accordance with changes in tilt angle, and solid lines LW12, LW22, LW32, LW42, LW52, and LW62 indicate changes in wavefront aberration, which is a total of all the aberrations, in accordance with changes in tilt angle. Moreover, in each figure, the abscissa axis indicates a tilt angle (degree), and the ordinate axis indicates the amount of aberration (m$\lambda$ rms).

As shown in FIG. 3A, the off-axis wavefront aberration is held low at 2.1 m$\lambda$ rms, the third-order coma aberration at a field of view of 1° is 76.5 m$\lambda$ rms, and the high-order coma aberration at a field of view of 1° is 15.8 m$\lambda$ rms.

Referring to FIG. 3B, in a case where the first and second surfaces have an eccentricity of 2 µm, the third-order coma aberration is 64.7 m$\lambda$ rms when the tilt angle is 0°, and a favorable aberration characteristic is difficult to be attained in this state. In this state, the high-order coma aberration is 9.9 m$\lambda$ rms, the third-order astigmatism is 0.1 m$\lambda$ rms, and the third-order spherical aberration is 0.3 m$\lambda$ rms.

However, by tilting the entire objective lens 7 so as to tilt the optical axis by 0.37°, the third-order coma aberration is cancelled and thus becomes 0.0 m$\lambda$ rms. In this state, the high-order coma aberration is 16.5 m$\lambda$ rms, the third-order astigmatism is 11.7 m$\lambda$ rms, and the third-order spherical aberration is 2.9 m$\lambda$ rms, whereby favorable aberration characteristics are attained.

According to the first embodiment, even if the first surface and the second surface have a surface-to-surface eccentricity of 2 µm, the aberration components including the third-order coma aberration, the high-order coma aberration, the third-order astigmatism, and the third-order spherical aberration can be sufficiently reduced, whereby the tolerance for the surface-to-surface eccentricity between the first and second surfaces can be 2 µm or more.

Furthermore, in comparison to the comparative example, the tilt angle that allows the third-order coma aberration to be 0 m$\lambda$ rms can be reduced to a lower angle (0.37°). In other words, in view of the lens diameter and the working distance mentioned above, the tilt angle can be held at 0.5° or lower, and the wavefront aberration can be significantly reduced to 22.6 m$\lambda$ rms.

As described above, the tilt angle of the objective lens 7 for canceling the third-order coma aberration occurring due to surface-to-surface eccentricity is preferably 0.5° or lower in view of attaining an appropriate shape of an objective-lens holder and an appropriate differential distance. The first embodiment satisfies this condition since the tilt angle of the objective lens 7 is reduced to 0.37° as shown in FIG. 3B. Such a condition will also be referred to as "the condition for a lens tilt angle at which a third-order coma aberration becomes 0 m$\lambda$ rms when there is surface-to-surface eccentricity".

Furthermore, in order to reduce the lens tilt angle necessary for canceling a third-order coma aberration caused by surface-to-surface eccentricity, the objective lens 7 is preferably designed such that, in a state where the optical axis of the objective lens 7 is aligned with a direction perpendicular to the signal recording face of the optical disc 8 under the above design conditions, the magnitude of third-order coma aberration (which is also referred to as a third-order coma aberration at 1° field of view) occurring upon incidence of light having a central axis that is tilted at 1° with respect to the optical axis of the objective lens 7 is above 30 m$\lambda$ rms. The design according to the first embodiment satisfies this condition since a third-order coma aberration of 76.5 m$\lambda$ rms occurs at 1° field of view as shown in FIG. 3A. Such a condition will also be referred to as "the condition for third-order coma aberration at 1° field of view under the design conditions".

When a third-order coma aberration occurring due to surface-to-surface eccentricity is to be cancelled by tilting the objective lens 7, the magnitude of a high-order coma aberration is preferably reduced to 20 m$\lambda$ rms or less. In order to achieve this, the objective lens 7 is preferably designed such that, in a state where the optical axis of the objective lens 7 is aligned with the direction perpendicular to the signal recording face of the optical disc 8 under the design conditions, a high-order coma aberration occurring upon incidence of light having a central axis tilted at 1° with respect to the optical axis of the objective lens 7 is reduced to 20 m$\lambda$ rms or less, and moreover, a high-order coma aberration occurring when the surface-to-surface eccentricity is 2 µm is also reduced to 20 m$\lambda$ rms or less. The design according to the first embodiment satisfies these conditions since a high-order coma aberration at 1° field of view is reduced to 15.8 m$\lambda$ rms, a high-order coma aberration when there is a surface-to-surface eccentricity of 2 µm is reduced to 9.9 m$\lambda$ rms, and a high-order coma aberration when a third-order coma aberration occurring due to surface-to-surface eccentricity is cancelled is reduced to 16.5 m$\lambda$ rms. Such conditions will also be referred to as "the condition for high-order coma aberration at 1° field of view under the design conditions" and "the condition for high-order coma aberration when there is surface-to-surface eccentricity".

In the above-described first embodiment and in second to sixth embodiments to be described below, when the objective lens 7 is tilted for canceling a third-order coma aberration occurring due to surface-to-surface eccentricity, a significant cancellation effect can be attained if a third-order coma aberration caused as a result of a light ray passing through the objective lens 7 and a third-order coma aberration occurring as a result of a light ray being slanted by the tilted objective lens 7 and passing through the optical disc 8 have the same sign. More specifically, the optical axis may be tilted so that a third-order coma aberration occurring at the objective lens 7 as a result of the tilting of the objective lens 7 and a third-order coma aberration occurring at the optical disc 8 as a result of the tilting of the objective lens 7 have the same sign. Thus, the total of these third-order coma aberrations can counterbalance a third-order coma aberration occurring due to surface-to-surface eccentricity so that the third-order coma aberration becomes substantially 0 m$\lambda$ rms.

Although the above-described first embodiment and second to sixth embodiments to be described below are described with reference to aberration characteristics obtained when the surface-to-surface eccentricity is 2 µm, if the eccentricity is between 0 and 2 µm, the aberrations become even smaller than those obtained from the aberration characteristics in each of the embodiments, and moreover, the tile angle also becomes smaller.

Second Embodiment

In the objective lens according to the second embodiment, "f", "n", "d", "t", and "NA" are as follows.

f: 2.2 (mm)

n: 1.597 d: 2.59 (mm)

t: 100 (µm)

NA: 0.85

"R", "K", and "$A_i$" indicating the shape of the first surface at the incidence side of the objective lens of the second embodiment are as follows.

The Shape of the First Surface
R: 1.514
K: −0.715
$A_4$: $1.010 \times 10^{-2}$
$A_6$: $-1.120 \times 10^{-4}$
$A_8$: $2.437 \times 10^{-3}$
$A_{10}$: $-1.467 \times 10^{-3}$
$A_{12}$: $3.033 \times 10^{-4}$
$A_{14}$: $2.156 \times 10^{-4}$
$A_{16}$: $-1.559 \times 10^{-4}$
$A_{18}$: $3.951 \times 10^{-5}$
$A_{20}$: $-3.732 \times 10^{-6}$ "R", "K", and "$A_i$" indicating the shape of the second surface at the emission side of the objective lens of the second embodiment are as follows.

Figure 4A:
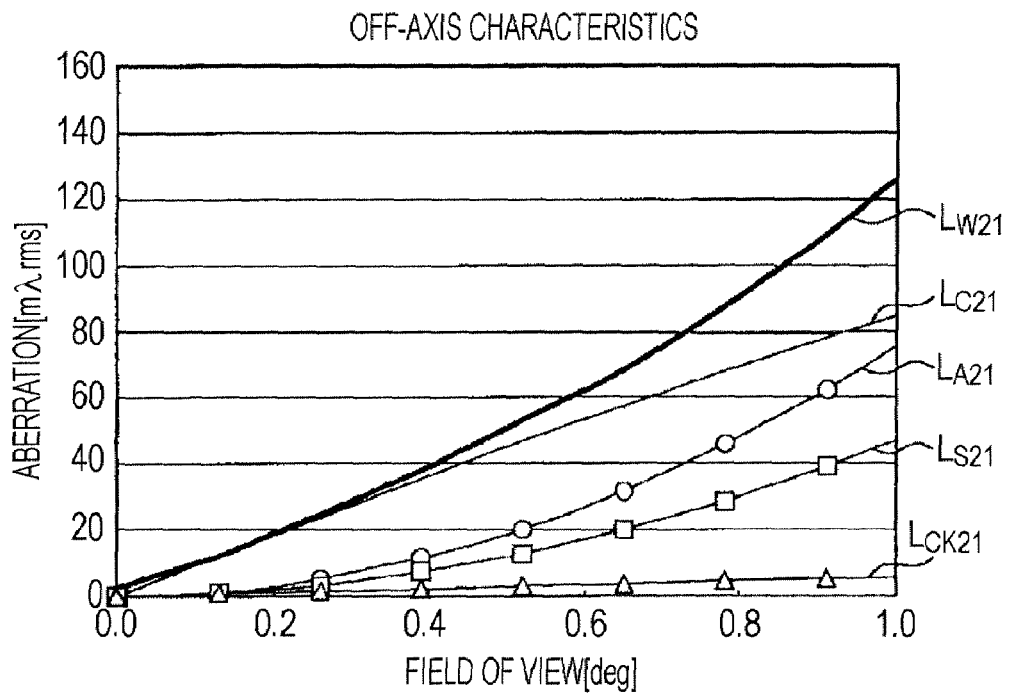
FIGS. 4A and 4B illustrate aberration characteristics of an objective lens according to a second embodiment, FIG. 4A illustrating off-axis characteristics and FIG. 4B illustrating tilt characteristics.
Figure 4B:
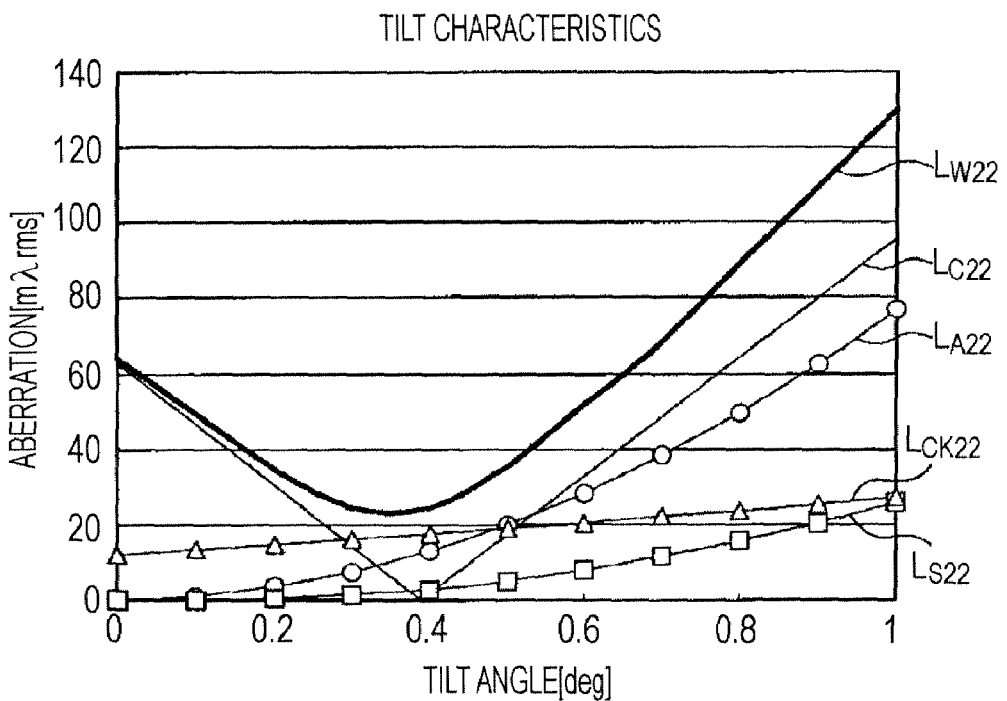

The Shape of the Second Surface
R: −3.550 (mm)
K: −73.364
$A_4$: $7.877 \times 10^{-2}$
$A_6$: $-8.531 \times 10^{-2}$
$A_8$: $7.121 \times 10^{-2}$
$A_{10}$: $-4.147 \times 10^{-2}$
$A_{12}$: $1.341 \times 10^{-2}$
$A_{14}$: $-1.665 \times 10^{-3}$
$A_{16}$: $-2.436 \times 10^{-4}$
$A_{18}$: $1.337 \times 10^{-4}$
$A_{20}$: $-2.397 \times 10^{-5}$ FIG. 4A shows off-axis characteristics obtained when a divergent light beam with an NA of 0.00243 is incident on the objective lens 7 with the above design conditions. FIG. 4B shows tilt characteristics in a case where the first and second surfaces have a surface-to-surface eccentricity of 2 μm under the above conditions. The solid lines in FIGS. 4A and 4B are as described above.

As shown in FIG. 4A, the off-axis wavefront aberration is held low at 2.6 mλ rms. Moreover, while the third-order coma aberration at 1° field of view is 84.6 mλ rms, the high-order coma aberration at 1° field of view is held low at 5.8 mλ rms.

Referring to FIG. 4B, in a case where the first and second surfaces have an eccentricity of 2 μm, the high-order coma aberration is held at 11.9 mλ rms.

Therefore, as shown in FIG. 4B, in a case where the first and second surfaces have an eccentricity of 2 μm, the third-order coma aberration is 62.4 mλ rms when the tilt angle is 0°, and a favorable aberration characteristic is difficult to be attained in this state. In this state, the high-order coma aberration is 11.9 mλ rms, the third-order astigmatism is 0.1 mλ rms, and the third-order spherical aberration is 0.1 mλ rms.

However, by tilting the entire objective lens 7 so as to tilt the optical axis by 0.39°, the third-order coma aberration is cancelled and thus becomes 0.0 mλ rms. In this state, the high-order coma aberration is 17.4 mλ rms, the third-order astigmatism is 12.6 mλ rms, and the third-order spherical aberration is 2.8 mλ rms, whereby favorable aberration characteristics are attained.

According to the second embodiment, even if the first surface and the second surface have a surface-to-surface eccentricity of 2 μm, the aberration components can be sufficiently reduced, whereby the tolerance for the surface-to-surface eccentricity between the first and second surfaces can be 2 μm or more.

Furthermore, in comparison to the comparative example, the tilt angle that allows the third-order coma aberration to be 0 mλ rms can be reduced to a lower angle (0.39°). In other words, the tilt angle can be held at 0.5° or lower, and the wavefront aberration can be significantly reduced to 24.6 mλ rms.

Similar to the first embodiment, the second embodiment satisfies the condition for a lens tilt angle at which a third-order coma aberration becomes 0 mλ rms when there is surface-to-surface eccentricity, the condition for third-order coma aberration at 1° field of view under the design conditions, the condition for high-order coma aberration at 1° field of view under the design conditions, and the condition for high-order coma aberration when there is surface-to-surface eccentricity.

Third Embodiment

In the objective lens according to the third embodiment, "f", "n", "d", "t", and "NA" are as follows.
f: 2.2 (mm)
n: 1.638
d: 2.59 (mm)
t: 87.5 (μm)
NA: 0.85

"R", "K", and "$A_i$" indicating the shape of the first surface at the incidence side of the objective lens of the third embodiment are as follows.

The Shape of the First Surface
R: 1.554
K: −0.661
$A_4$: $8.089 \times 10^{-3}$
$A_6$: $-9.957 \times 10^{-4}$
$A_8$: $3.247 \times 10^{-3}$
$A_{10}$: $-1.774 \times 10^{-3}$
$A_{12}$: $2.168 \times 10^{-4}$
$A_{14}$: $3.244 \times 10^{-4}$
$A_{16}$: $-1.877 \times 10^{-4}$
$A_{18}$: $4.157 \times 10^{-5}$
$A_{20}$: $-3.474 \times 10^{-6}$ "R", "K", and "$A_i$" indicating the shape of the second surface at the emission side of the objective lens of the third embodiment are as follows.

Figure 5A:
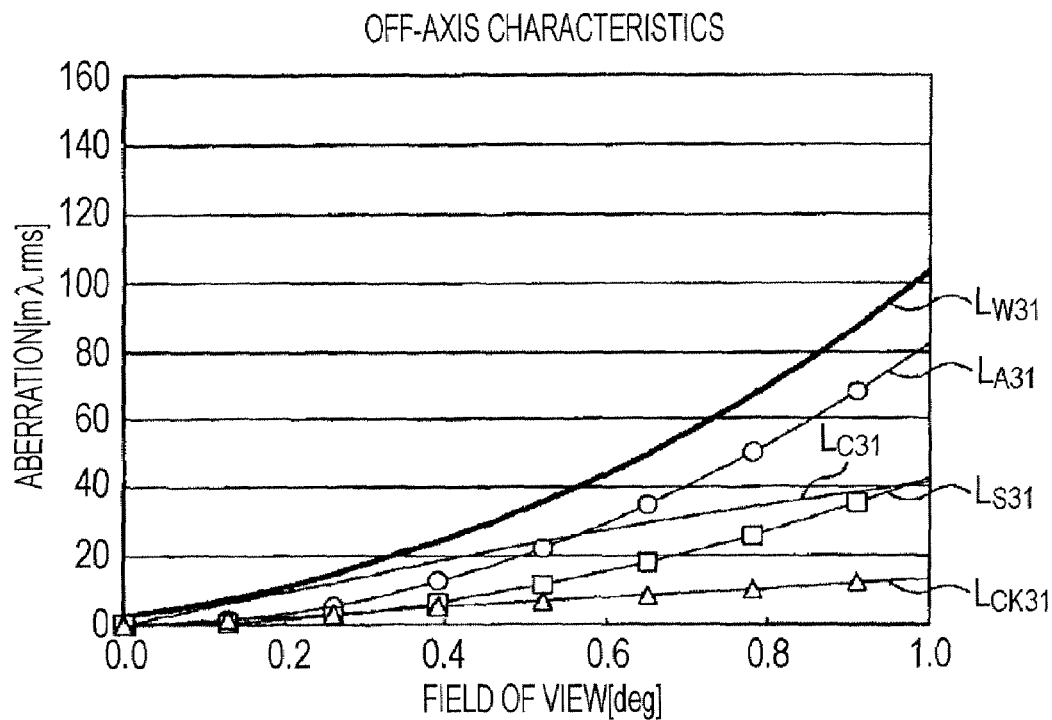
FIGS. 5A and 5B illustrate aberration characteristics of an objective lens according to a third embodiment, FIG. 5A illustrating off-axis characteristics and FIG. 5B illustrating tilt characteristics.
Figure 5B:
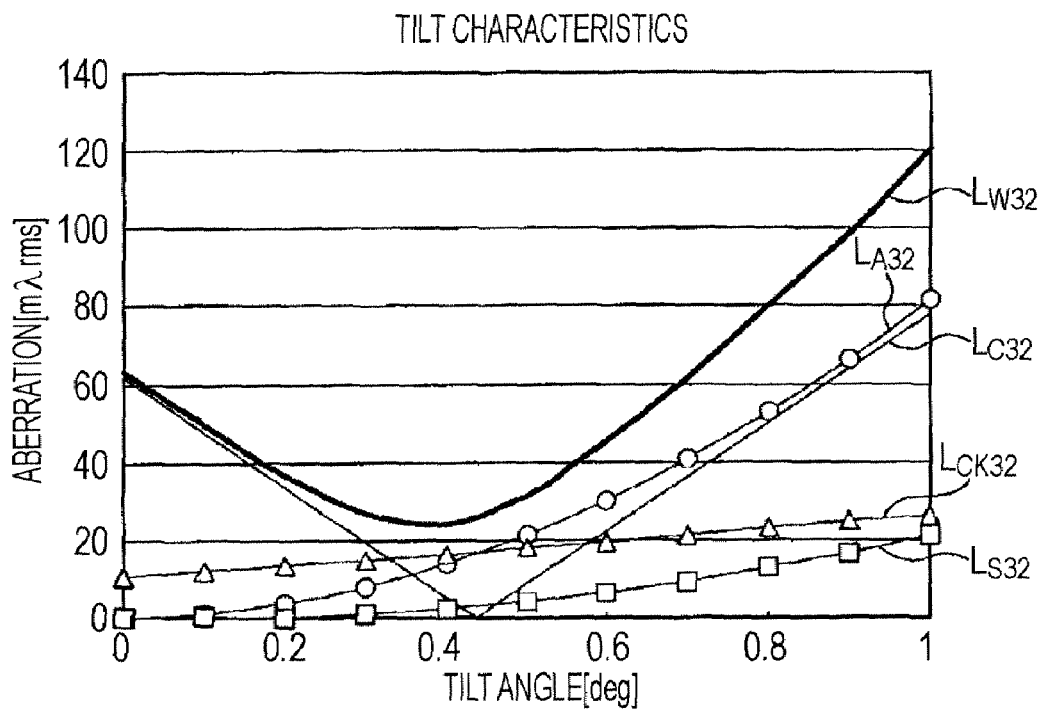

The Shape of the Second Surface
R: −5.055
K: −84.685
$A_4$: $1.217 \times 10^{-1}$
$A_6$: $-1.372 \times 10^{-1}$
$A_8$: $9.295 \times 10^{-2}$
$A_{10}$: $-3.779 \times 10^{-2}$
$A_{12}$: $7.084 \times 10^{-3}$
$A_{14}$: $1.931 \times 10^{-4}$
$A_{16}$: $-2.087 \times 10^{-4}$ FIG. 5A shows off-axis characteristics obtained when a collimated light beam is incident on the objective lens 7 with the above design conditions. FIG. 5B shows tilt characteristics in a case where the first and second surfaces have a surface-to-surface eccentricity of 2 μm under the above conditions. The solid lines in FIGS. 5A and 5B are as described above.

As shown in FIG. 5A, the off-axis wavefront aberration is held low at 2.9 mλ rms. Moreover, while the third-order coma aberration at 1° field of view is 41.5 mλ rms, the high-order coma aberration at 1° field of view is held low at 13.1 mλ rms.

Referring to FIG. 5B, in a case where the first and second surfaces have an eccentricity of 2 μm, the high-order coma aberration is held at 10.6 mλ rms.

Therefore, as shown in FIG. 5B, in a case where the first and second surfaces have an eccentricity of 2 μm, the third-order coma aberration is 61.7 mλ rms when the tilt angle is 0°, and a favorable aberration characteristic is difficult to be attained in this state. In this state, the high-order coma aberration is 10.6 m$\lambda$ rms, the third-order astigmatism is 0.1 m$\lambda$ rms, and the third-order spherical aberration is 0.2 m$\lambda$ rms.

However, by tilting the entire objective lens 7 so as to tilt the optical axis by 0.44°, the third-order coma aberration is cancelled and thus becomes 0.0 m$\lambda$ rms. In this state, the high-order coma aberration is 16.9 m$\lambda$ rms, the third-order astigmatism is 16.0 m$\lambda$ rms, and the third-order spherical aberration is 2.8 m$\lambda$ rms, whereby favorable aberration characteristics are attained.

According to the third embodiment, even if the first surface and the second surface have a surface-to-surface eccentricity of 2 μm, the aberration components can be sufficiently reduced, whereby the tolerance for the surface-to-surface eccentricity between the first and second surfaces can be 2 μm or more.

Furthermore, in comparison to the comparative example, the tilt angle that allows the third-order coma aberration to be 0 m$\lambda$ rms can be reduced to a lower angle (0.44°). In other words, the tilt angle can be held at 0.5° or lower, and the wavefront aberration can be significantly reduced to 26.9 m$\lambda$ rms.

Similar to the first embodiment, the third embodiment satisfies the condition for a lens tilt angle at which a third-order coma aberration becomes 0 m$\lambda$ rms when there is surface-to-surface eccentricity, the condition for third-order coma aberration at 1° field of view under the design conditions, the condition for high-order coma aberration at 1° field of view under the design conditions, and the condition for high-order coma aberration when there is surface-to-surface eccentricity.

Fourth Embodiment

In the objective lens according to the fourth embodiment, "f", "n", "d", "t", and "NA" are as follows.

f: 2.2 (mm)
n: 1.597
d: 2.26 (mm)
t: 87.5 (μm)
NA: 0.85

"R", "K", and "$A_i$" indicating the shape of the first surface at the incidence side of the objective lens of the fourth embodiment are as follows.

The Shape of the First Surface
R: 1.487 (mm)
K: −0.662
$A_4$: 8.329×10$^{-3}$
$A_6$: −2.677×10$^{-4}$
$A_8$: 2.588×10$^{-3}$
$A_{10}$: −1.561×10$^{-3}$
$A_{12}$: 3.056×10$^{-4}$
$A_{14}$: 2.191×10$^{-4}$
$A_{16}$: −1.545×10$^{-4}$
$A_{18}$: 3.948×10$^{-5}$
$A_{20}$: −3.814×10$^{-6}$ "R", "K", and "$A_i$" indicating the shape of the second surface at the emission side of the objective lens of the fourth embodiment are as follows.

Figure 6A:
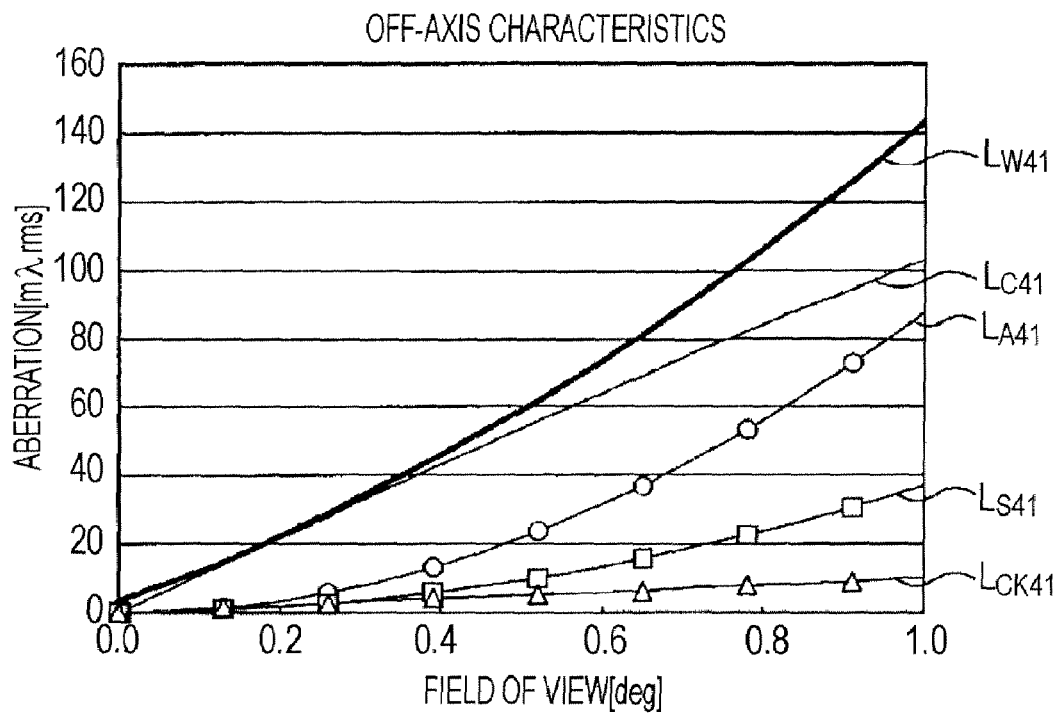
FIGS. 6A and 6B illustrate aberration characteristics of an objective lens according to a fourth embodiment, FIG. 6A illustrating off-axis characteristics and FIG. 6B illustrating tilt characteristics.
Figure 6B:
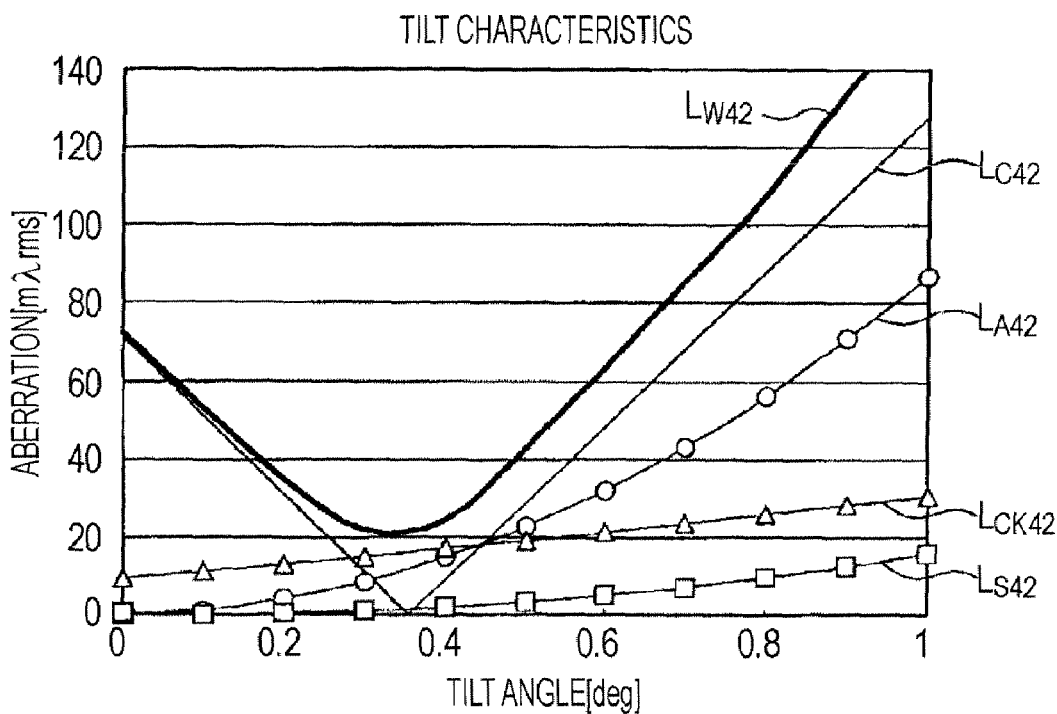

The Shape of the Second Surface
R: −4.830 (mm)
K: −66.561
$A_4$: 7.666×10$^{-2}$
$A_6$: −8.715×10$^{-2}$
$A_8$: 7.497×10$^{-2}$
$A_{10}$: −4.159×10$^{-2}$
$A_{12}$: 1.304×10$^{-2}$
$A_{14}$: −1.752×10$^{-3}$
$A_{16}$: −1.256×10$^{-4}$
$A_{18}$: 6.567×10$^{-5}$
$A_{20}$: −5.630×10$^{-6}$ FIG. 6A shows off-axis characteristics obtained when a collimated light beam is incident on the objective lens 7 with the above design conditions. FIG. 6B shows tilt characteristics in a case where the first and second surfaces have a surface-to-surface eccentricity of 2 μm under the above conditions. The solid lines in FIGS. 6A and 6B are as described above.

As shown in FIG. 6A, the off-axis wavefront aberration is held low at 3.6 m$\lambda$ rms. Moreover, while the third-order coma aberration at 1° field of view is 102.7 m$\lambda$ rms, the high-order coma aberration at 1° field of view is held low at 10.0 m$\lambda$ rms.

Referring to FIG. 6B, in a case where the first and second surfaces have an eccentricity of 2 μm, the high-order coma aberration is held at 9.1 m$\lambda$ rms.

Therefore, as shown in FIG. 6B, in a case where the first and second surfaces have an eccentricity of 2 μm, the third-order coma aberration is 70.7 m$\lambda$ rms when the tilt angle is 0°, and a favorable aberration characteristic is difficult to be attained in this state. In this state, the high-order coma aberration is 9.1 m$\lambda$ rms, the third-order astigmatism is 0.1 m$\lambda$ rms, and the third-order spherical aberration is 0.3 m$\lambda$ rms.

However, by tilting the entire objective lens 7 so as to tilt the optical axis by 0.36°, the third-order coma aberration is cancelled and thus becomes 0.0 m$\lambda$ rms. In this state, the high-order coma aberration is 16.0 m$\lambda$ rms, the third-order astigmatism is 12.0 m$\lambda$ rms, and the third-order spherical aberration is 1.4 m$\lambda$ rms, whereby favorable aberration characteristics are attained.

According to the fourth embodiment, even if the first surface and the second surface have a surface-to-surface eccentricity of 2 μm, the aberration components can be sufficiently reduced, whereby the tolerance for the surface-to-surface eccentricity between the first and second surfaces can be 2 μm or more.

Furthermore, in comparison to the comparative example, the tilt angle that allows the third-order coma aberration to be 0 m$\lambda$ rms can be reduced to a lower angle (0.36°). In other words, the tilt angle can be held at 0.5° or lower, and the wavefront aberration can be significantly reduced to 23.4 m$\lambda$ rms.

Similar to the first embodiment, the fourth embodiment satisfies the condition for a lens tilt angle at which a third-order coma aberration becomes 0 m$\lambda$ rms when there is surface-to-surface eccentricity, the condition for third-order coma aberration at 1° field of view under the design conditions, the condition for high-order coma aberration at 1° field of view under the design conditions, and the condition for high-order coma aberration when there is surface-to-surface eccentricity.

Fifth Embodiment

In the objective lens according to the fifth embodiment, "R", "n", "d", "t", and "NA" are as follows.

f: 2.2 (mm)
n: 1.604
d: 2.26 (mm)
t: 87.5 (μm)
NA: 0.85

"R", "K", and "$A_i$" indicating the shape of the first surface at the incidence side of the objective lens of the fifth embodiment are as follows.

The Shape of the First Surface
R: 1.496 (mm)
K: −0.666
$A_4$: 8.474×10$^{-3}$
$A_6$: −2.573×10$^{-4}$
$A_8$: 2.562×10$^{-3}$
$A_{10}$: −1.519×10$^{-3}$
$A_{12}$: 3.037×10$^{-4}$
$A_{14}$: 2.186×10$^{-4}$
$A_{16}$: −1.548×10$^{-4}$
$A_{18}$: 3.952×10$^{-5}$
$A_{20}$: −3.792×10$^{-6}$ "R", "K", and "$A_i$" indicating the shape of the second surface at the emission side of the objective lens of the fifth embodiment are as follows.

Figure 7A:
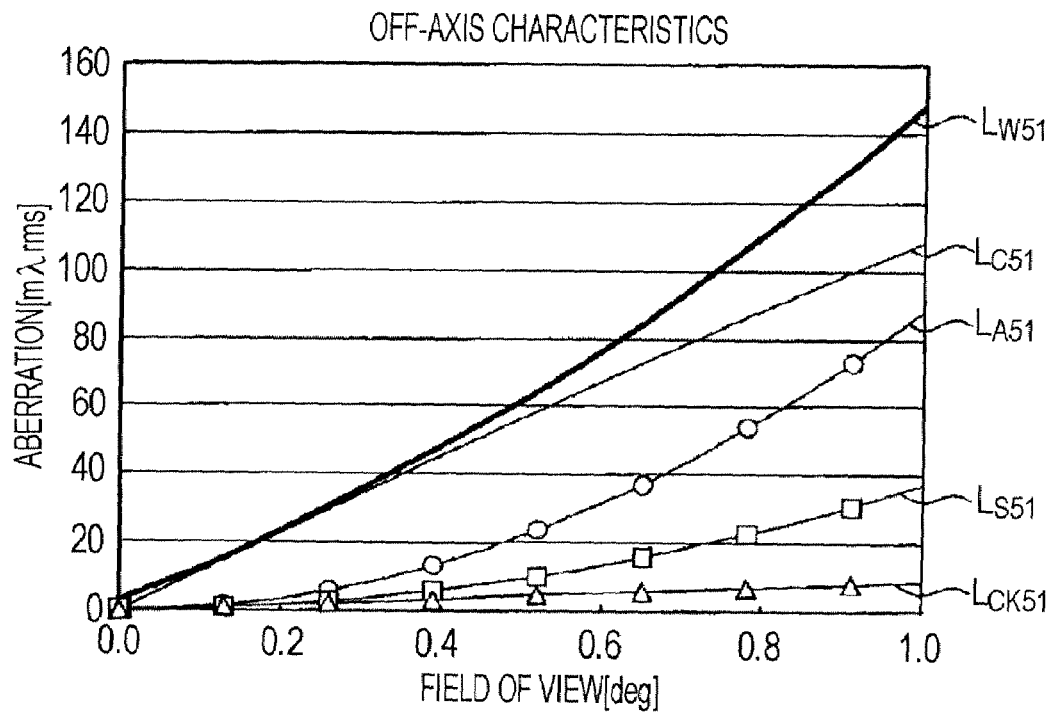
FIGS. 7A and 7B illustrate aberration characteristics of an objective lens according to a fifth embodiment, FIG. 7A illustrating off-axis characteristics and FIG. 7B illustrating tilt characteristics.
Figure 7B:
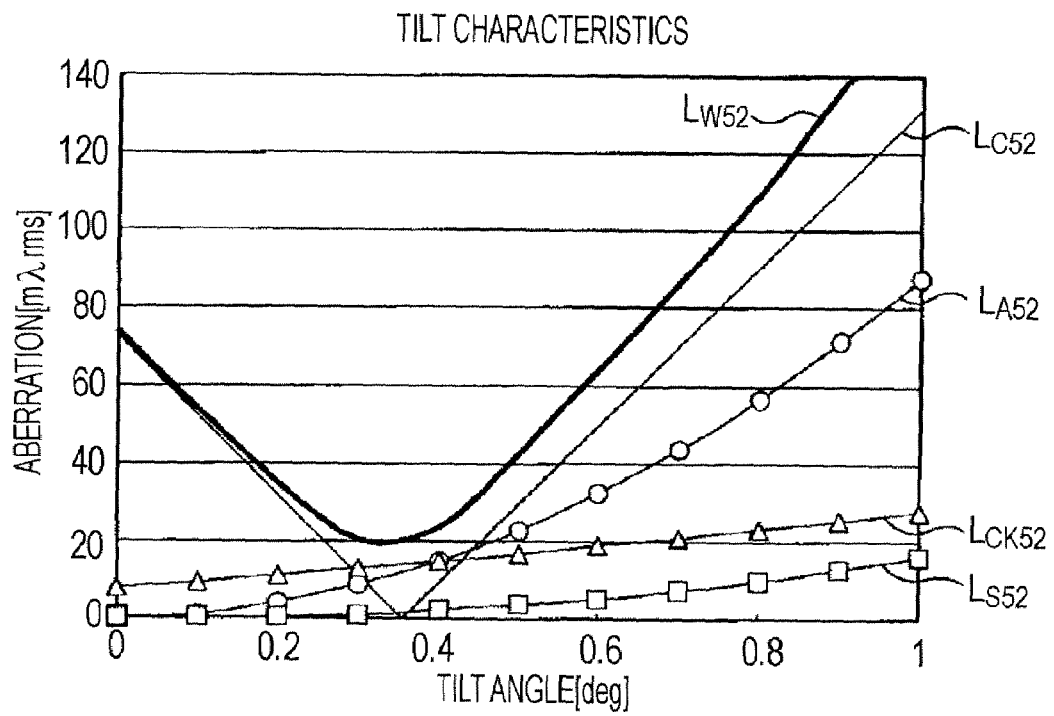

The Shape of the Second Surface
R: −5.103 (mm)
K: −71.610
$A_4$: 7.756×10$^{-2}$
$A_6$: −8.770×10$^{-2}$
$A_8$: 7.512×10$^{-2}$
$A_{10}$: −4.154×10$^{-2}$
$A_{12}$: 1.302×10$^{-2}$
$A_{14}$: −1.758×10$^{-3}$
$A_{16}$: −1.277×10$^{-4}$
$A_{18}$: 6.922×10$^{-5}$
$A_{20}$: −6.343×10$^{-6}$ FIG. 7A shows off-axis characteristics obtained when a collimated light beam is incident on the objective lens 7 with the above design conditions. FIG. 7B shows tilt characteristics in a case where the first and second surfaces have a surface-to-surface eccentricity of 2 μm under the above conditions. The solid lines in FIGS. 7A and 7B are as described above.

As shown in FIG. 7A, the off-axis wavefront aberration is held low at 3.2 mλ rms. Moreover, while the third-order coma aberration at 1° field of view is 108.4 mλ rms, the high-order coma aberration at 1° field of view is held low at 8.4 mλ rms.

Referring to FIG. 7B, in a case where the first and second surfaces have an eccentricity of 2 μm, the high-order coma aberration is held at 7.9 mλ rms.

Therefore, as shown in FIG. 7B, in a case where the first and second surfaces have an eccentricity of 2 μm, the third-order coma aberration is 72.5 mλ rms when the tilt angle is 0°, and a favorable aberration characteristic is difficult to be attained in this state. In this state, the high-order coma aberration is 7.9 mλ rms, the third-order astigmatism is 0.1 mλ rms, and the third-order spherical aberration is 0.5 mλ rms.

However, by tilting the entire objective lens 7 so as to tilt the optical axis by 0.35°, the third-order coma aberration is cancelled and thus becomes 0.0 mλ rms. In this state, the high-order coma aberration is 14.1 mλ rms, the third-order astigmatism is 12.0 mλ rms, and the third-order spherical aberration is 1.6 mλ rms, whereby favorable aberration characteristics are attained.

According to the fifth embodiment, even if the first surface and the second surface have a surface-to-surface eccentricity of 2 μm, the aberration components can be sufficiently reduced, whereby the tolerance for the surface-to-surface eccentricity between the first and second surfaces can be 2 μm or more.

Furthermore, in comparison to the comparative example, the tilt angle that allows the third-order coma aberration to be 0 mλ rms can be reduced to a lower angle (0.35°). In other words, the tilt angle can be held at 0.5° or lower, and the wavefront aberration can be significantly reduced to 22.1 mλ rms.

Similar to the first embodiment, the fifth embodiment satisfies the condition for a lens tilt angle at which a third-order coma aberration becomes 0 mλ rms when there is surface-to-surface eccentricity, the condition for third-order coma aberration at 1° field of view under the design conditions, the condition for high-order coma aberration at 1° field of view under the design conditions, and the condition for high-order coma aberration when there is surface-to-surface eccentricity.

Sixth Embodiment

In the objective lens according to the sixth embodiment, "f", "n", "d", "t", and "NA" are as follows.
f: 2.2 (mm)
n: 1.646
d: 2.2 (mm)
t: 87.5 (μm)
NA: 0.85

"R", "K", and "$A_i$" indicating the shape of the first surface at the incidence side of the objective lens of the sixth embodiment are as follows.

The Shape of the First Surface
R: 1.534 (mm)
K: −0.537
$A_4$: 3.994×10$^{-3}$
$A_6$: −1.320×10$^{-3}$
$A_8$: 2.876×10$^{-3}$
$A_{10}$: −1.848×10$^{-3}$
$A_{12}$: 3.698×10$^{-4}$
$A_{14}$: 2.347×10$^{-4}$
$A_{16}$: −1.686×10$^{-4}$
$A_{18}$: 4.222×10$^{-5}$
$A_{20}$: −3.960×10$^{-6}$ "R", "K", and "$A_i$" indicating the shape of the second surface at the emission side of the objective lens of the sixth embodiment are as follows.

Figure 8A:
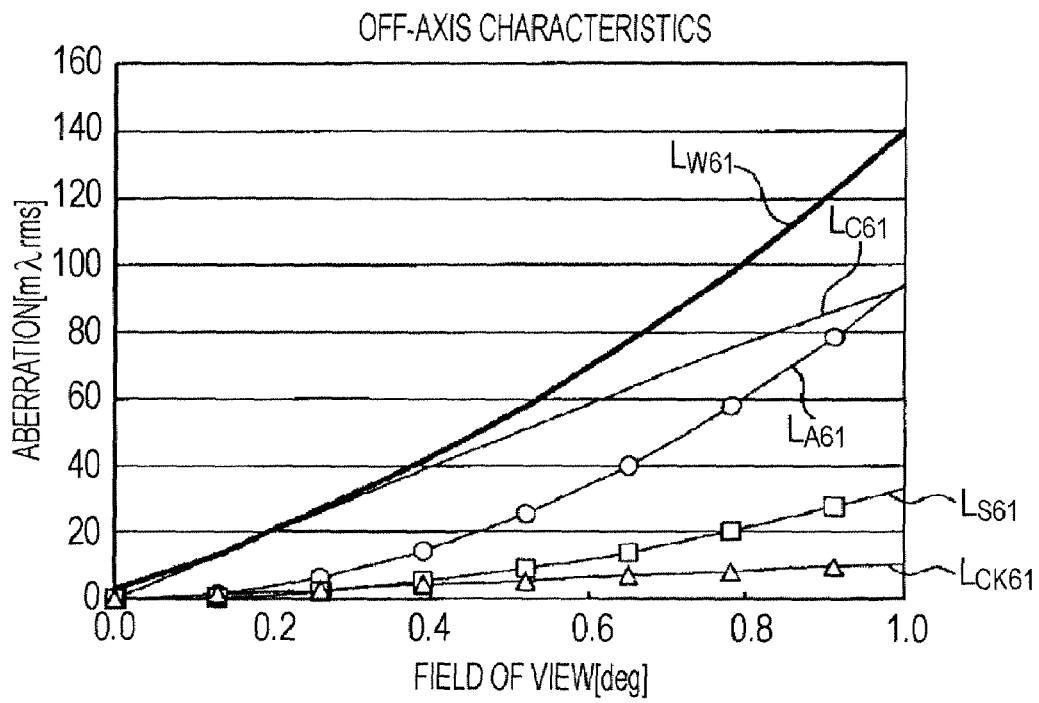
FIGS. 8A and 8B illustrate aberration characteristics of an objective lens according to a sixth embodiment, FIG. 8A illustrating off-axis characteristics and FIG. 8B illustrating tilt characteristics.
Figure 8B:
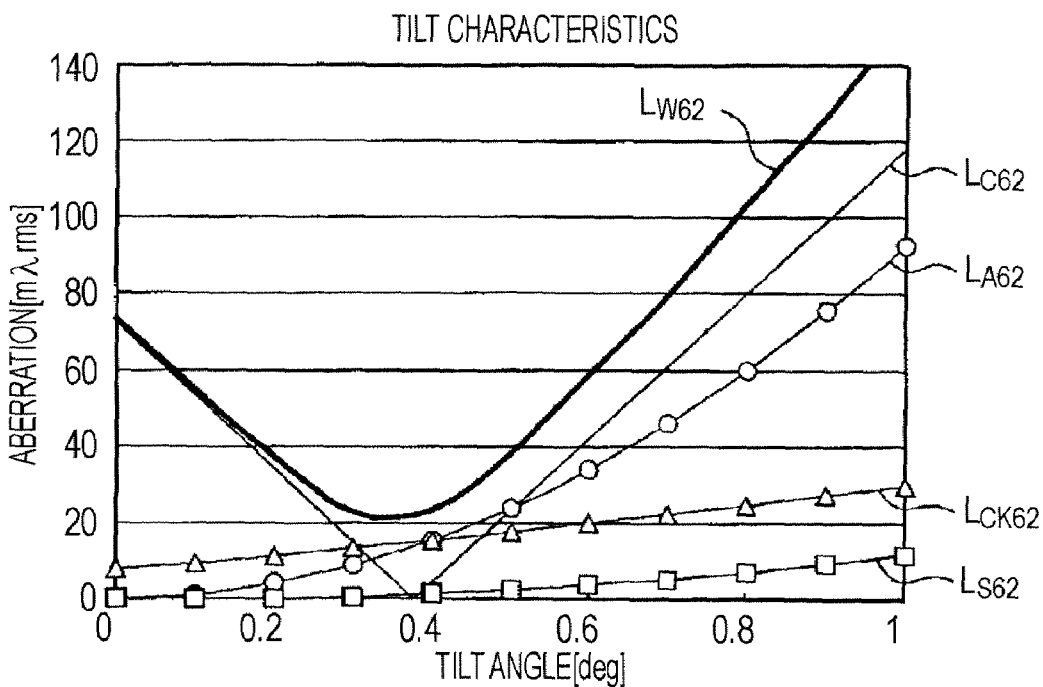

The Shape of the Second Surface
R: −8.433 (mm)
K: −74.396
$A_4$: 8.758×10$^{-2}$
$A_6$: −9.176×10$^{-2}$
$A_8$: 7.170×10$^{-2}$
$A_{10}$: −3.586×10$^{-2}$
$A_{12}$: 9.679×10$^{-3}$
$A_{14}$: −8.902×10$^{-4}$
$A_{16}$: −1.407×10$^{-4}$
$A_{18}$: 2.783×10$^{-5}$ FIG. 8A shows off-axis characteristics obtained when a collimated light beam is incident on the objective lens 7 with the above design conditions. FIG. 8B shows tilt characteristics in a case where the first and second surfaces have a surface-to-surface eccentricity of 2 μm under the above conditions. The solid lines in FIGS. 8A and 8B are as described above.

As shown in FIG. 8A, the off-axis wavefront aberration is held low at 3.2 mλ rms. Moreover, while the third-order coma aberration at 1° field of view is 93.6 mλ rms, the high-order coma aberration at 1° field of view is held low at 10.2 mλ rms.

Referring to FIG. 8B, in a case where the first and second surfaces have an eccentricity of 2 μm, the high-order coma aberration is held at 7.7 mλ rms.

Therefore, as shown in FIG. 8B, in a case where the first and second surfaces have an eccentricity of 2 μm, the third-order coma aberration is 72.2 mλ rms when the tilt angle is 0°, and a favorable aberration characteristic is difficult to be attained in this state. In this state, the high-order coma aberration is 7.7 mλ rms, the third-order astigmatism is 0.0 mλ rms, and the third-order spherical aberration is 0.2 mλ rms.

However, by tilting the entire objective lens 7 so as to tilt the optical axis by 0.38°, the third-order coma aberration is cancelled and thus becomes 0.0 mλ rms. In this state, the high-order coma aberration is 15.0 mλ rms, the third-order astigmatism is 14.0 mλ rms, and the third-order spherical aberration is 1.2 mλ rms, whereby favorable aberration characteristics are attained.

According to the sixth embodiment, even if the first surface and the second surface have a surface-to-surface eccentricity of 2 μm, the aberration components can be sufficiently reduced, whereby the tolerance for the surface-to-surface eccentricity between the first and second surfaces can be 2 μm or more.

Furthermore, in comparison to the comparative example, the tilt angle that allows the third-order coma aberration to be 0 mλ rms can be reduced to a lower angle (0.38°). In other words, the tilt angle can be held at 0.5° or lower, and the wavefront aberration can be significantly reduced to 23.1 mλ rms.

Similar to the first embodiment, the sixth embodiment satisfies the condition for a lens tilt angle at which a third-order coma aberration becomes 0 mλ rms when there is surface-to-surface eccentricity, the condition for third-order coma aberration at 1° field of view under the design conditions, the condition for high-order coma aberration at 1° field of view under the design conditions, and the condition for high-order coma aberration when there is surface-to-surface eccentricity.

Accordingly, in contrast to the comparative example in which the objective lens is permitted to have a surface-to-surface eccentricity of only 1 μm or less between the first surface and the second surface, the objective lens 7 according to the first to sixth embodiments and the optical pickup device 1 equipped with the objective lens 7 are permitted to have an eccentricity of 2 μm or more.

The optical pickup device 1 is equipped with an objective lens 7 having a high numerical aperture and intended for short wavelengths, and controls the aberration components when an off-axis aberration or surface-to-surface eccentricity occurs. Thus, the optical pickup device 1 achieves greater tolerance for surface-to-surface eccentricity while favorable recording/reproducing properties are maintained. In addition, the greater tolerance for surface-to-surface eccentricity contributes to greater fabrication tolerance, a higher yield rate, and cost reduction for lens fabrication.

Specifically, the objective lens 7, the optical pickup device 1, and the optical disc apparatus according to the embodiments of the present invention control off-axis third-order coma aberration characteristics so as to control the aberration components when surface-to-surface eccentricity occurs. This expands the tolerance for surface-to-surface eccentricity and thus alleviates the permissible value for fabrication errors, thereby achieving a higher yield rate and cost reduction.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens included in an optical pickup device that records an information signal onto and/or reproduces an information signal from an optical recording medium, wherein the objective lens has a numerical aperture of 0.82 or higher and has a first surface and a second surface that are both aspherical, the objective lens focusing a light beam onto the optical recording medium, the first surface and the second surface having surface-to-surface eccentricity therebetween that causes an aberration, the aberration being correctable by tilting an optical axis of the objective lens relative to a central axis of the light beam incident on the objective lens, and
wherein the aberration caused by the surface-to-surface eccentricity includes a third-order coma aberration, and wherein when the optical axis is tilted relative to the central axis of the incident light beam so that the third-order coma aberration becomes substantially 0 mλ rms, each of astigmatism, spherical aberration, and high-order coma aberration becomes 20 mλ rms or less.

2. An optical pickup device that records an information signal onto and/or reproduces an information signal from an optical recording medium, the optical pickup device comprising:
an objective lens that has a numerical aperture of 0.82 or higher and has a first surface and a second surface that are both aspherical, the objective lens focusing a light beam onto the optical recording medium, the objective lens having surface-to-surface eccentricity between a first surface and a second surface thereof, the surface-to-surface eccentricity causing an aberration that is correctable by tilting an optical axis of the objective lens relative to a central axis of the light beam incident on the objective lens,
wherein the aberration caused by the surface-to-surface eccentricity includes a third-order coma aberration, and wherein when the optical axis is tilted relative to the central axis of the incident light beam so that the third-order coma aberration becomes substantially 0 mλ rms, each of astigmatism, spherical aberration, and high-order coma aberration becomes 20 mλ rms or less.

3. The optical pickup device according to claim 2, wherein when the surface-to-surface eccentricity is 2 μm, the optical axis of the objective lens is tilted relative to the central axis of the incident light beam by a tilt angle of 0.5° or lower in order to allow the third-order coma aberration caused by the surface-to-surface eccentricity to become substantially 0 mλ rms.

4. The optical pickup device according to claim 2, wherein the optical axis of the objective lens is tilted such that a third-order coma aberration occurring at the objective lens as a result of the tilting of the objective lens relative to the central axis of the incident light and a third-order coma aberration occurring at the optical recording medium as a result of the tilting of the objective lens have the same sign, the two third-order coma aberrations counterbalancing the third-order coma aberration caused by the surface-to-surface eccentricity so that the third-order coma aberration caused by the surface-to-surface eccentricity becomes substantially 0 mλ rms.

5. An optical disc apparatus comprising:
an optical pickup device that records an information signal onto and/or reproduces an information signal from an optical recording medium,
wherein the optical pickup device includes
an objective lens that has a numerical aperture of 0.82 or higher and has a first surface and a second surface that are both aspherical, the objective lens focusing a light beam onto the optical recording medium, the objective lens having surface-to-surface eccentricity between a first surface and a second surface thereof, the surface-to-surface eccentricity causing an aberration that is correctable by tilting an optical axis of the objective lens relative to a central axis of the light beam incident on the objective lens, and
wherein the aberration caused by the surface-to-surface eccentricity includes a third-order coma aberration, and wherein when the optical axis is tilted relative to the central axis of the incident light beam so that the third-order coma aberration becomes substantially 0 mλ rms, each of astigmatism, spherical aberration, and high-order coma aberration becomes 20 mλ rms or less.

* * * * *